G. Jaquith.
Carding Mach.

No. 103,889.  Patented Jun. 7, 1870.

Witnesses.
Gustave Dieterich
Alex H. Roberts

Inventor.
G. Jaquith
Attorneys.

UNITED STATES PATENT OFFICE.

GILMAN JAQUITH, OF CONCORD, MASSACHUSETTS.

IMPROVEMENT IN CARDING-MACHINE.

Specification forming part of Letters Patent No. 103,889, dated June 7, 1870.

*To all whom it may concern:*

Be it known that I, GILMAN JAQUITH, of Concord, in the county of Middlesex and State of Massachusetts, have invented a new and useful Improvement in Cotton-Carding Machines; and I do hereby declare that the following is a full, clear, and exact description thereof, which will enable others skilled in the art to make and use the same, reference being had to the accompanying drawing, forming part of this specification.

The object of this invention is to obviate some difficulties which are met with in carding cotton on ordinary machines, and to improve them in various particulars; and consists in the means provided for receiving and disposing of the dirt and foreign substances extracted from cotton and the like while carding, as will be hereinafter more fully described.

Figure 1:
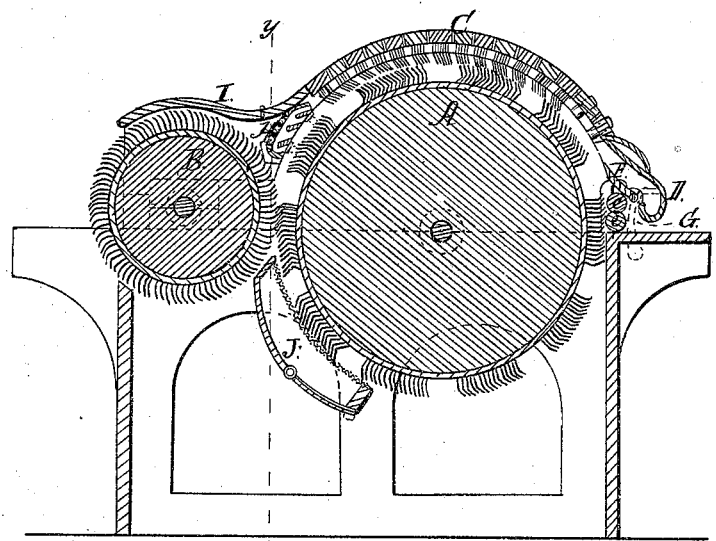
Figure 2:
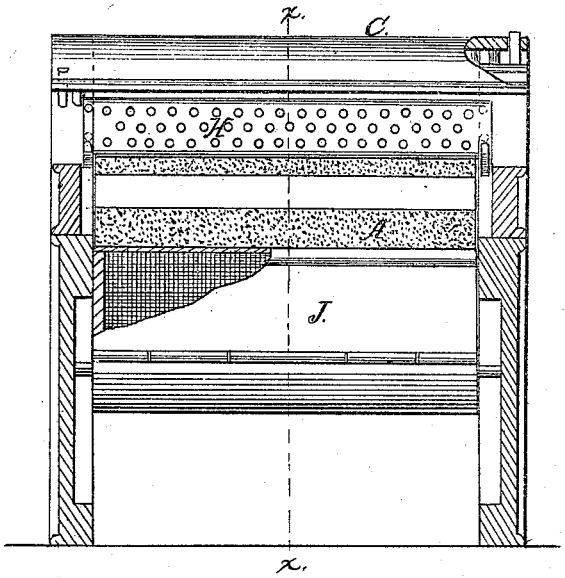

In the accompanying drawing, Figure 1 represents a vertical cross-section of a carding-machine on the line $x\ x$ of Fig. 2, with my improvements applied. Fig. 2 is a vertical longitudinal section on the line $y\ y$ of Fig. 1.

Similar letters of reference indicate corresponding parts.

A is the main carding-cylinder. B is the doffer. C represents a series of stationary, but removable, top cards.

Between the feed-rollers and the first top card I introduce a receptacle, D, for receiving the dirt separated from the cotton.

The width of the sheet of cotton which passes through the machine is about the same as the length of the feed-rollers.

The card-cylinder moves rapidly and combs out the dirt and "black leaf," heavier than the cotton, and throws it off by centrifugal force. Some of this dirt also falls on the feed-rolls as the teeth of the top flap nearest them regain their normal position, after being deflected by the card-strip on the main cylinder, and is carried through and embedded in greater or lesser quantities with the cotton. I place a receptacle for this dirt about one-fourth of an inch from the feed-rolls, and a little below their top.

$e\ e$ represent the feed-rolls. F is a flap or clapper, which extends across the machine over the feed-rolls, and is attached to a rod, with a weighted arm, G, at its end. This flap may be vibrated or thrown over toward the receptacle D by the vibrating arm of what is known as the "Wellman stripper," so as to discharge the accumulated dirt into the receptacle D.

H is a receptacle for the dirt, which, to a considerable extent, will be carried around and thrown from the cylinder after the cards have passed the last top card. This receptacle may contain one or more compartments. It is placed beneath the doffer-cap I, and may be removed from time to time for discharging its contents, and it is constantly gathering dirt and foreign matter while the machine is in operation.

Beneath the receptacle last named, and below the point where the cylinder and doffer come together, I place a box, J. The side of the box next the cylinder is covered with wire cloth or gauze. As the cylinder revolves, the cotton is transferred to the doffer, when more or less dirt is freed and falls into this receptacle, instead of onto the floor.

By my arrangement the dirt sifts through the wire screen and is received into the box beneath, and not allowed to mingle with the "flyings." The gauze or perforated side of this box is in the form of the arc of a circle, and is concentric with the arc of the main cylinder.

The arc extends about twenty inches under the cylinder, and covers the entire under surface of the cylinder to that extent.

By means of the three receptacles above described, very little dirt or foreign matter is suffered to go into the goods manufactured. The quality of the cloth or thread is, consequently, greatly improved.

Having thus described my invention, I claim as new and desire to secure by Letters Patent—

1. The combination and relative arrangement with the main cylinder and feed-rolls of a carding-machine, of the dirt-receptacle D and vibrating flap F, constructed and operating as and for the purposes described.

2. The combination of the dirt-receptacles H and J, constructed as described, and arranged in reference to the main cylinder and doffer, as and for the purpose set forth.

The above specification of my invention signed by me this 4th day of January, 1870.

GILMAN JAQUITH.

Witnesses:
GEO. W. MABEE,
ALEX. F. ROBERTS.